US008882422B2

(12) United States Patent
Hussain et al.

(10) Patent No.: US 8,882,422 B2
(45) Date of Patent: Nov. 11, 2014

(54) SEAL (75) Inventors: Zahid M. Hussain, Derby (GB); Brian A. Handley, Derby (GB); Andrew J. Mullender, Nottingham (GB)

(73) Assignee: Rolls-Royce PLC, London (GB)

( * ) Notice: Subject to any disclaimer, the term of this patent is extended or adjusted under 35 U.S.C. 154(b) by 92 days.

(21) Appl. No.: 13/109,468

(22) Filed: May 17, 2011

(65) Prior Publication Data

US 2011/0309587 A1 Dec. 22, 2011

(30) Foreign Application Priority Data

Jun. 17, 2010 (GB) .................................. 1010169.9

(51) Int. Cl.
F16B 39/28 (2006.01)
F16J 15/06 (2006.01)

(52) U.S. Cl.
CPC .................................. *F16J 15/061* (2013.01)
USPC .......................................... 411/140; 411/141

(58) Field of Classification Search
USPC ......... 277/421, 598, 609, 616, 630, 637, 925; 411/140, 141
See application file for complete search history.

(56) References Cited

U.S. PATENT DOCUMENTS

| 1,184,173 | A | * | 5/1916 | Gehring ......................... 411/140 |
| 1,829,293 | A | * | 10/1931 | Olson ............................ 411/140 |
| 2,586,869 | A | * | 2/1952 | Sculthorpe ............... 340/815.75 |
| 2,638,642 | A | * | 5/1953 | Spraragen ..................... 49/492.1 |
| 3,635,272 | A | * | 1/1972 | Scheffer ........................ 411/303 |
| 3,661,046 | A | * | 5/1972 | Waud et al. ................... 411/369 |
| 4,004,626 | A | | 1/1977 | Biblin et al. |
| 4,630,971 | A | * | 12/1986 | Herbst et al. ............... 405/259.5 |
| 4,842,364 | A | * | 6/1989 | Chen ............................. 385/136 |
| 4,861,197 | A | * | 8/1989 | Calandra, Jr. .............. 405/259.3 |
| 5,074,773 | A | * | 12/1991 | Tischler ........................ 425/134 |
| 5,107,623 | A | | 4/1992 | Weil |
| 5,397,157 | A | * | 3/1995 | Hempel et al. ................ 285/227 |
| 6,211,465 | B1 | * | 4/2001 | Streit ............................ 174/653 |
| 6,386,545 | B1 | * | 5/2002 | Evans ........................... 277/336 |
| 6,533,288 | B1 | * | 3/2003 | Brandner et al. ............. 277/630 |
| 7,751,676 | B2 | * | 7/2010 | Riley et al. ................... 385/138 |
| 7,798,755 | B2 | * | 9/2010 | Tomm .......................... 411/310 |
| 7,862,280 | B2 | * | 1/2011 | Su ................................ 411/411 |
| 2010/0078932 | A1 | | 4/2010 | Gurtatowski |
| 2011/0028913 | A1 | * | 2/2011 | Muramatsu et al. .......... 604/222 |

FOREIGN PATENT DOCUMENTS

| DE | 31 15 036 A1 | 11/1982 |
| GB | 2 432 639 A | 5/2007 |
| JP | A-2007-162812 | 6/2007 |
| WO | WO 2007/122134 A1 | 11/2007 |
| WO | WO 2010/012347 A1 | 2/2010 |

OTHER PUBLICATIONS

Aug. 30, 2011 Search Report issued in European Patent Application No. EP 11 16 6324.
British Search Report issued in Great Britain Application No. GB1010169.9 dated Oct. 5, 2010.

* cited by examiner

*Primary Examiner* — Kristina Fulton
*Assistant Examiner* — Eugene G Byrd
(74) *Attorney, Agent, or Firm* — Oliff PLC (57) ABSTRACT

A seal having an integral attachment arrangement. The attachment arrangement comprises at least one attachment feature and at least one locking feature. The at least one attachment feature is configured and arranged to interdigitate with features of another component in a first orientation and to lock to the other component in a second orientation. The second orientation is rotationally displaced from the first orientation.

12 Claims, 6 Drawing Sheets

SEAL

The present invention relates to a seal having an integral attachment arrangement.

Seals are used in a variety of applications to prevent movement of fluid across an interface. It is usually necessary to attach the seal to one or both of the components forming the interface to fix it in place and at the desired orientation. In aerospace applications, among others, seals have a short life compared to other components and therefore need to be replaced regularly. It is therefore advantageous to attach the seal in a manner that allows quick and simple removal and replacement.

It is known to chemically bond seals to components. However, in order to replace a chemically bonded seal it is necessary to remove it, often by cutting away, and then to clean the surface of the component before a new seal can be chemically bonded in place. This is time-consuming and thus expensive.

It is also known to use mechanical attachment arrangements such as rivets, bolts, clips and the like. However, rivets must be drilled out in order to remove and replace a seal which is time-consuming and expensive. Bolts introduce a significantly higher parts count which may increase the weight, problematic in some applications particularly for aerospace, and raises the risk of foreign object damage to components from dropped or shed nuts, bolts or washers. Clips must be accurately sized in order to perform and are unsuitable where there is noticeable movement across the seal interface, for example caused by vibration. Clips are therefore relatively expensive to manufacture, may be ineffective and increase the risk of foreign object damage to components from dropped or shed clips.

Where a seal is used to seal between fire zones, in a gas turbine engine, power plant, ship or other application, it is critical that the seal is securely attached to one or both components forming the interface to be sealed, that it remains attached in fire conditions and that it can be efficiently replaced as required.

The present invention provides a seal that seeks to address the aforementioned problems.

Accordingly the present invention provides a seal having an integral attachment arrangement, the attachment arrangement comprising at least one attachment feature and at least one locking feature, the at least one attachment feature configured and arranged to interdigitate with features of another component in a first orientation and to lock to the other component in a second orientation, wherein the second orientation is rotationally displaced from the first orientation. This is advantageous because it reduces the part count and weight by obviating the need for additional clips or other retaining features to hold the seal into position. It also improves the speed and reliability of fitting and the ease of replacement.

The at least one attachment feature may comprise bayonet-type protrusions. This is quick and simple to fit. Alternatively, the at least one attachment feature may comprise a partial screw thread extending at least some of the way around the periphery of the attachment feature. This provides a more load-resistant fitting.

The at least one locking feature may comprise a pin located on the seal or located on the attachment feature. Alternatively the at least one locking feature may comprise a distorted shape to the attachment feature at the end distal to the seal. Alternatively the locking feature may comprise an uneven pitch screw thread. All of these locking features resist accidental rotation of the seal to disengage the seal from the component to which it is coupled.

The seal may be a block seal having one attachment feature and one locking feature. Alternatively the seal may be a linear seal having multiple attachment features. The seal is flexible such that each attachment feature is rotated between its first and second orientation by rotating that part of the seal on which it is located.

The seal may be omega-shaped in cross section. Alternatively the seal may be double-omega shaped in cross section, being circular with opposed flat surfaces in cross section, the attachment features being arranged on the flat surfaces such that rotation in one direction moves opposed pairs of attachment features from their first to their second orientations. This increases the speed of fitting.

The seal may be comprised of silicate impregnated elastomeric. The locking feature may also be comprised of silicate impregnated elastomeric or may be comprised of metal.

The other component may comprise a seal locking plate having an attachment aperture to receive each of the at least one attachment features in the first orientation and to be locked to the at least one attachment feature in the second orientation.

The present invention will be more fully described by way of example with reference to the accompanying drawings, in which.

Figure 1:
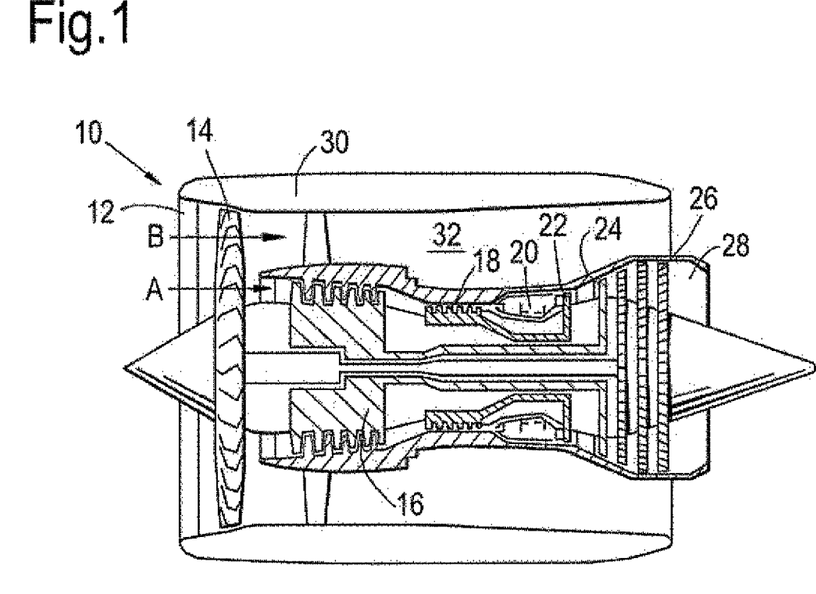
FIG. 1 is a sectional side view of a gas turbine engine in which a seal according to the present invention may be used.

A gas turbine engine 10 is shown in FIG. 1 and comprises an air intake 12 and a propulsive fan 14 that generates two airflows A and B. The gas turbine engine 10 comprises, in axial flow A, an intermediate pressure compressor 16, a high pressure compressor 18, a combustor 20, a high pressure turbine 22, an intermediate pressure turbine 24, a low pressure turbine 26 and an exhaust nozzle 28. A nacelle 30 surrounds the gas turbine engine 10 and defines, in axial flow B, a bypass duct 32.

The gas turbine engine 10 is separated into fire zones, there being interfaces between adjacent fire zones that require sealing. For certification of a gas turbine engine it is necessary to prevent fire from propagating through such boundaries for a given period of time and to arrest propagation for a further period thereafter to allow safe shut down of the engine or other remedial action to occur. It is therefore necessary that the seal does not become detached from the components forming the interface.

A block seal 34 is generally positioned at the end of a linear or curvilinear seal 48 in order to seal the end of that linear seal 48. The block seal 34 is substantially cubic and is hollow to allow some compression in sealing. A block seal 34 may be formed from a silicate impregnated elastomeric, where the silicate may be glass, which is highly rigid so that it retains it shape but has sufficient flexibility to be marginally compressible to improve its sealing capability. A pad seal is similar to a block seal 34 but is typically compressed in one direction only, whereas a block seal 34 is often subjected to compression forces in more than one direction at once.

Figure 2:
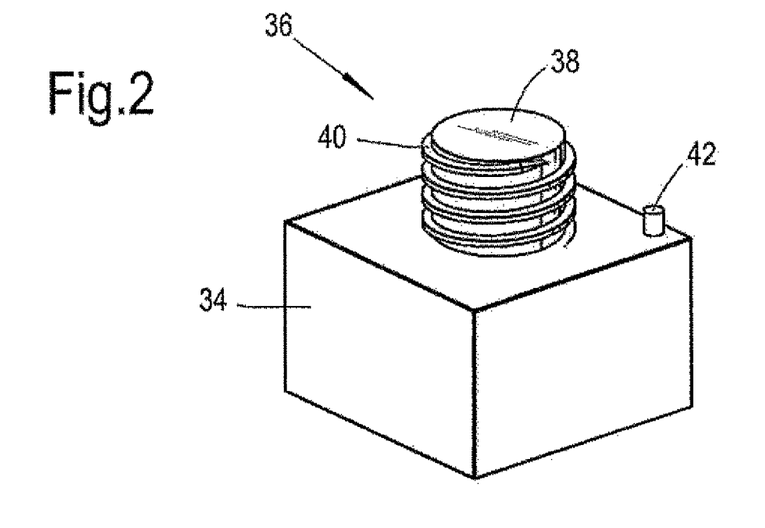
FIG. 2 is an embodiment of an attachment arrangement according to the present invention shown on a block seal with an embodiment of a locking feature.

A block seal 34 comprising a first embodiment of an attachment arrangement 36 according to the present invention is shown in FIG. 2. This embodiment is suitable for attachment to one component forming an interface to be sealed, the other component abutting the block seal 34 on the surface opposed to the attachment arrangement 36. The attachment arrangement 36 comprises an elongate attachment feature 38 in the form of a solid upstanding cylinder. There is a screw thread 40 that extends around the periphery of the attachment feature 38 for engagement with another component. The length of the screw thread 40 is determined by the particular application and depends on the required interference load and strength of seal attachment to the component. In this embodiment the screw thread 40 circumnavigates the attachment feature 38 several times.

The screw thread 40 on the attachment feature 38 is configured and arranged to interdigitate with a matching groove feature of one of the components to be sealed (not shown) in a first orientation. Rotating the block seal 34 and integral attachment feature 38 screws the screw thread 40 into the component to be sealed until the attachment feature 38 is in a second orientation and locked to the component. In this embodiment, the first and second orientations may be aligned but rotational displacement is required to move from the first to the second orientation. Alternatively, the ends of the screw thread 40 may be unaligned so that the first and second orientations are also unaligned.

The embodiment of FIG. 2 also comprises an anti-rotation locking feature 42 located on the block seal 34. The locking feature 42 is a pin extending parallel to the attachment feature 38 and is arranged to engage with an aperture in the component to which the block seal 34 is attached in order to prevent the block seal 34 from being inadvertently detached. The locking feature 42 may comprise the same material as the block seal 34, for example the silicate impregnated elastomeric, in which case the locking feature 42 may be integrally formed with or bonded to the block seal 34. Alternatively the locking feature 42 may comprise metal and be bonded to or otherwise secured to the block seal 34.

Figure 3:
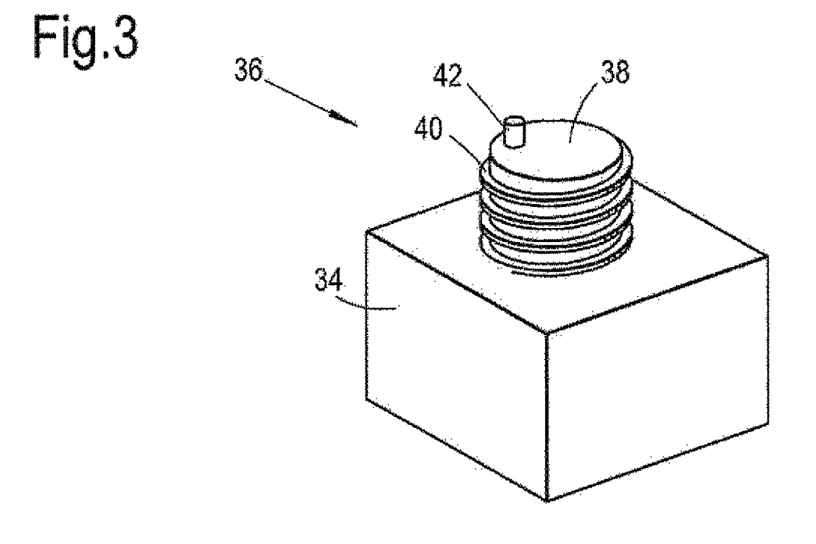
FIG. 3 is the embodiment of the attachment arrangement according to the present invention shown on a block seal with another embodiment of a locking feature.

FIG. 3 shows the first embodiment of the attachment arrangement 36 but with the locking feature 42, comprising a pin, located on the end of the attachment feature 38 that is distal to the block seal 34 rather than located on the block seal 34 itself.

Figure 4:
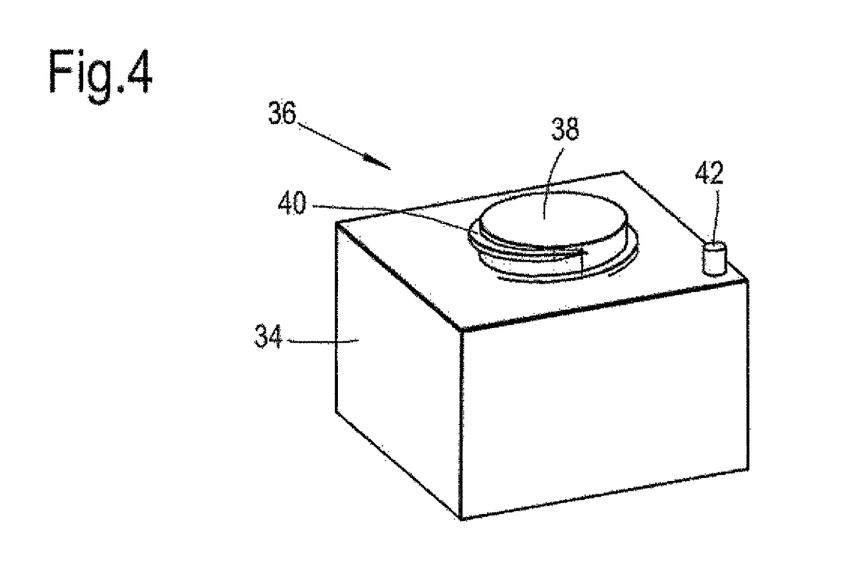
FIG. 4 is another embodiment of an attachment arrangement according to the present invention shown on a block seal with one embodiment of the locking feature.

FIG. 4 shows a second embodiment of the attachment arrangement 36 for a block seal 34 with the locking feature 42 located on the block seal 34 as in the first embodiment (FIG. 2). In this embodiment the attachment feature 38 is shorter than in the first embodiment and the screw thread 40 is only long enough that the second orientation of the attachment arrangement 36 is rotationally displaced by half a revolution from the first orientation. This means that attachment of the block seal 34 to the component is quicker than the first embodiment, although it may be less resistant to loading. For example, a block seal 34 located at the end of a C-duct is subjected to simultaneous shear and compression loading, the shear being applied on a radius as the duct pivots closed.

Figure 5:
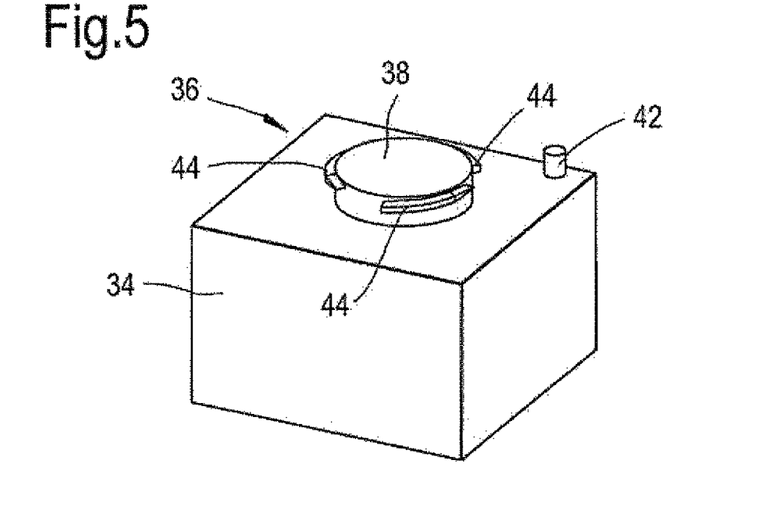
FIG. 5 is another embodiment of an attachment arrangement according to the present invention shown on a block seal with one embodiment of the locking feature.

FIG. 5 shows a third embodiment of the attachment arrangement 36 of the present invention applied to a block seal 34. The attachment arrangement 36 again comprises an elongate attachment feature 38 that is in the form of a solid cylinder extending away from a surface of the block seal 34. The attachment feature 38 is relatively short in this direction. In this embodiment there are a plurality of partial screw threads 44, three are drawn although other numbers are equally feasible. Each partial screw thread 44 extends round a part of the periphery of the attachment feature 38 so that in the first orientation one end of each partial screw thread 44 interdigitates with a matching feature on the component to which the seal is to be attached. The attachment feature 38 is then rotated by rotating the block seal 34, about a quarter turn, until it is in the second orientation, the partial screw threads 44 lock the attachment feature 38 to the component and the locking feature 42 engages an aperture in the component.

Although not illustrated, the partial screw threads 44 may be longer or shorter than shown in the third embodiment and consequently there may be fewer or more partial screw threads 44. Additionally the locking feature 42 may be located on the attachment feature 38 rather than on the block seal 34.

Figure 6:
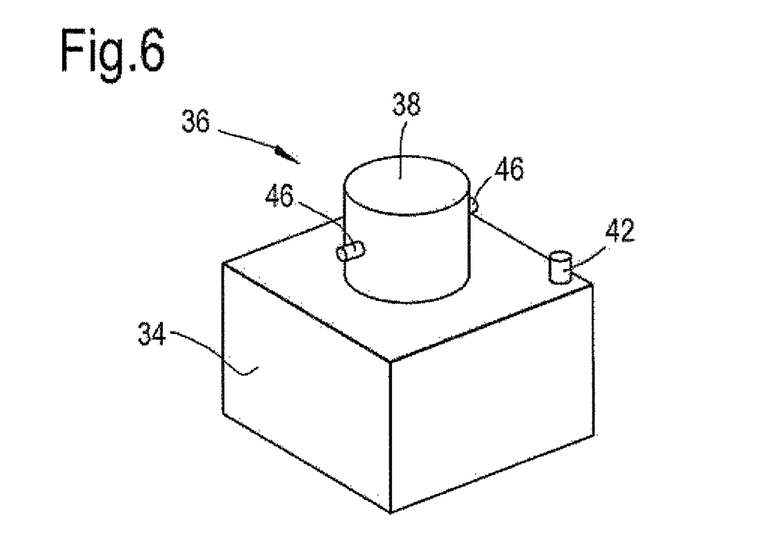
FIG. 6 is another embodiment of an attachment arrangement according to the present invention shown on a block seal with one embodiment of the locking feature.

FIG. 6 shows a fourth embodiment of the attachment arrangement 38. The locking feature 42 is shown on the block seal 34 although it is to be understood that it may alternatively be located on the attachment feature 38. In this embodiment the attachment feature 38 comprises pins 46 extending radially from the rotational axis of the attachment feature 38 to form a bayonet-style arrangement. As illustrated, two pins 46 extend diametrically opposite to each other but it is to be understood that more than two pins 46 may be provided. The pins 46 are preferably equi-angularly spaced but could alternatively be spaced unevenly around the periphery of the attachment feature 38 so that the block seal 34 can only be attached to the component in one orientation.

In the first orientation of the fourth embodiment, the pins 46 are aligned with elongate apertures in the component to be sealed and inserted therethrough. The block seal 34 and integral attachment feature 38 are then rotated so that the pins 46 extend over part of the component to lock the block seal 34 to the component. The locking feature 42 engages at the appropriate orientation.

Figure 7:
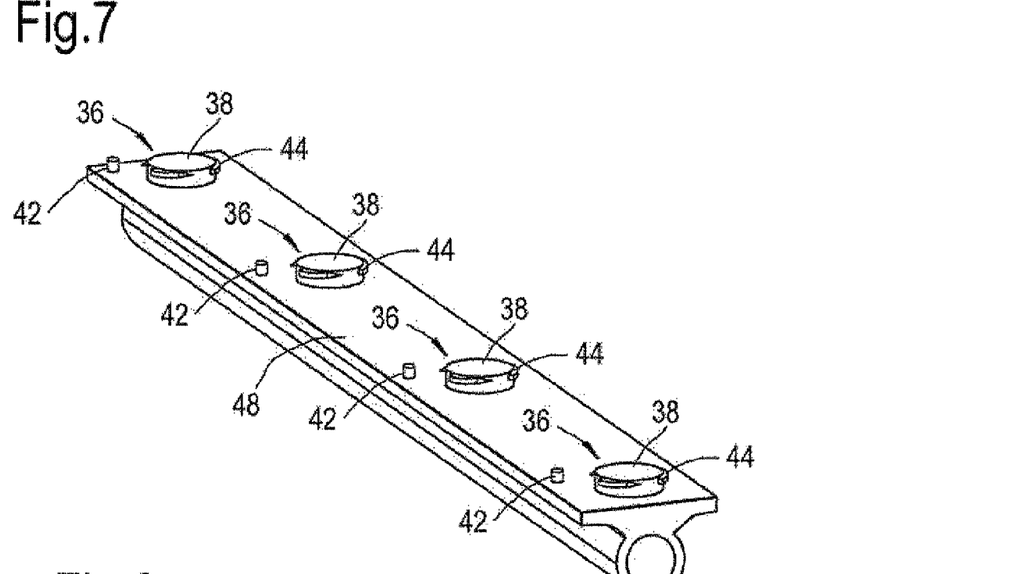
FIG. 7 is one embodiment of the attachment arrangement according to the present invention shown on a linear seal with one embodiment of the locking feature.

Instead of a block seal 34, the attachment arrangement 36 can be provided on a linear seal 48. It is intended that such a linear seal 48 can be used to seal a straight interface between components or to be flexed into a curvilinear shape to seal a curved interface. One form of the linear seal 48 can be seen in FIG. 7 in which the cross section is Ω-shaped, having a circular portion with a flat portion forming a tangent to the circular portion. Preferably there are multiple attachment arrangements 36 provided for attaching the linear seal 48 to a component. The attachment arrangements 36 are spaced along the flat portion. In FIG. 7 each attachment arrangement 36 is of the third embodiment type having a plurality of partial screw threads 44 extending around the periphery of the attachment feature 38. A plurality of locking features 42 is located on the linear seal 48, with one locking feature 42 for each attachment arrangement 36.

Figure 8:
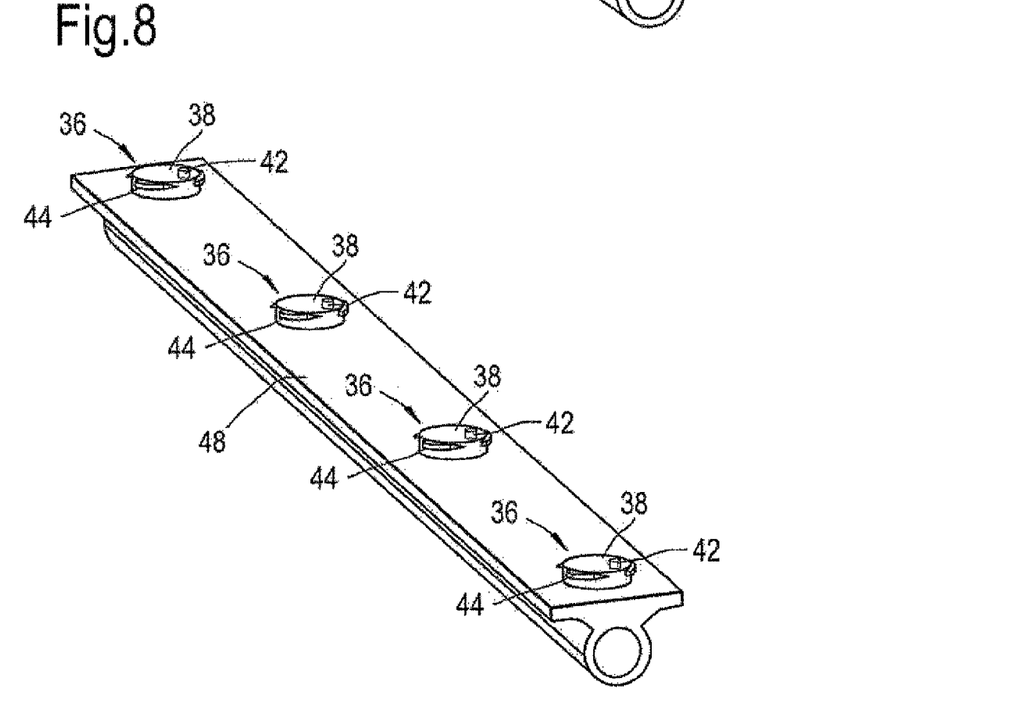
FIG. 8 is one embodiment of the attachment arrangement according to the present invention shown on a linear seal with one embodiment of the locking feature.

FIG. 8 is substantially similar to FIG. 7 except that each locking feature 42 is located on a respective attachment feature 38 instead of on the linear seal 48.

Figure 9:
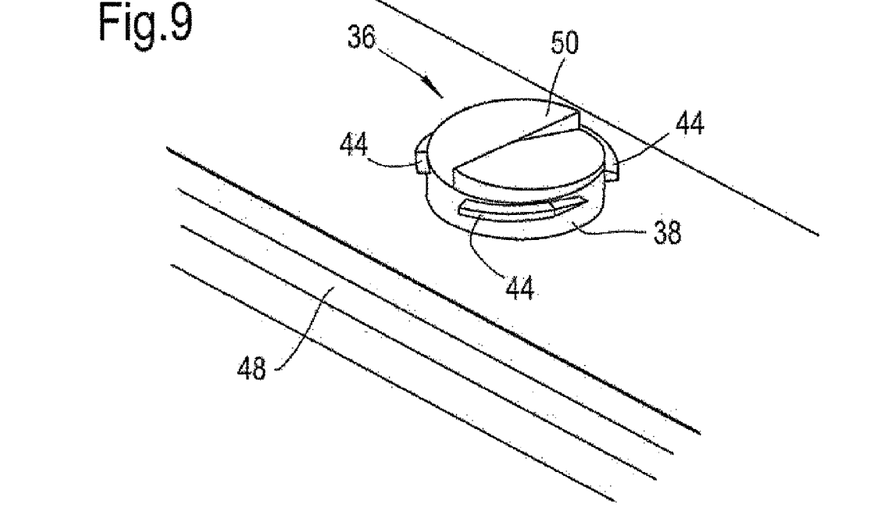
FIG. 9 is an enlargement of one embodiment of the attachment arrangement according to the present invention shown on a linear seal with another embodiment of a locking feature.

FIG. 9 shows the third embodiment of the attachment arrangement 36 having partial screw threads 44 extending around the periphery of the attachment feature 38. It is located on a linear seal 48, only part of which is shown. FIG. 9 also shows a third embodiment of the locking feature. Instead of having the form of a pin 42 located on either the seal 34, 48 or on the attachment feature 38, the third embodiment of the locking feature modifies the end 50 of the attachment feature 38 itself. The end 50 of the attachment feature 38 that is distal to the linear seal 48 has a distorted shape so that it resembles two semi-circular portions that are each angled relative to the plane of the flat portion of the linear seal 48 and to each other. The end 50 is configured relative to the threads 44 so that in the first orientation of the attachment arrangement 36, parts of the component to which the linear seal 48 is attached abut part of the end 50. The attachment arrangement 36 is then rotated towards the second orientation in which the parts of the component ride up the portions of the end 50 until they drop onto the lowest part. In the second orientation further rotation in the same direction tightens the locking and reverse rotation is prevented by the vertical wall delimiting the two semi-circular portions from one another.

Although the linear seal 48 arrangements have each been shown with the same, third embodiment of the attachment arrangement 36 it will be apparent to the skilled reader that any of the embodiments may be used. In particular the bayonet-style pins 46 may be provided on the attachment feature 38 instead of the partial screw threads 44.

Each linear seal 48 preferably has a plurality of attachment arrangements 36 provided along its length. Any of the second, third and fourth embodiments of the attachment arrangement 36 is suitable for attachment of the linear seal 48 to a component. In some applications it may be preferable to have a mixture of the embodiments so that, for example, an attachment arrangement 36 comprising partial screw threads 44 is adjacent to an attachment arrangement 36 comprising bayonet-style pins 46. The linear seal 48 is formed of a material having sufficient flexibility, and the attachment arrangements 36 are spaced accordingly, so that a user can rotate one attachment arrangement 36 and the portion of the linear seal 48 on which it is located at a time.

Thus the user starts at one end of the linear seal 48 and rotates the first attachment arrangement 36 to its first orientation relative to the component, pushes the attachment feature 38 towards the component to cause interdigitation of the attachment feature 38 and part of the component, and then rotates the attachment arrangement 36 to its second orientation. The user then moves along the linear seal 48 to the next attachment arrangement 36 and repeats the procedure until all the attachment arrangements 36 are locked to the component. This arrangement is advantageous because it is quick for the user to attach the seal to the component, and there are no extra parts to increase weight or get lost or to work loose and cause damage. To remove and replace the linear seal 48, the user works along the seal rotating each attachment arrangement 36 in turn from its second orientation to its first orientation where it can be moved away from the component. This is quick and simple to do.

The locking features 42, 50 reduce the likelihood that the attachment will work loose during use, for example under stress from vibrations, and further secure the seal 34, 48 to the component. There may be a locking feature 42, 50 for each attachment arrangement 36 or fewer locking features 42 than attachment arrangements 36.

Optionally silicon sealant may be applied to the flat portion of the linear seal 48 before the attachment arrangements 36 are attached to the component so that additionally sealing is provided. This may be necessary where the linear seal 48 is made from a highly rigid material so that the attachment arrangements 36 are well spaced apart from each other. It should be appreciated that applying silicon sealant makes it slower to remove and replace the seal 34, 48.

Although the linear seal 48 has been described as Ω-shaped in cross section, it may have a different shape in cross section. For example, it may be 'double Ω-shaped' in cross section, having a circular portion with opposed flat surfaces. In this case, the attachment arrangements 36 are provided on each of the flat surfaces. In a preferred embodiment, an attachment arrangement 36 on one flat surface is aligned with an attachment arrangement 36 on the other flat surface to form an opposed pair. The opposed pair of attachment arrangements 36 are arranged so that rotation of that part of the seal in one direction moves both attachment features 38 from their first orientation to their second orientation. In the embodiments where the attachment features 38 comprise screw threads 40 or partial screw threads 44, one of the opposed pair has a right-hand thread and the other of the opposed pair has a left-hand thread. The opposed pair of attachment arrangements 36 can therefore be attached to the respective components at the same time.

Whether the block seal 34 or linear seal 48 is used, the seal can be configured to have different material properties in the seal part and in the attachment arrangement 36. Thus the block 34 or linear seal 48 may be more flexible than the attachment arrangement 36 so that the part of the seal near the attachment arrangement 36 may be rotated to move the attachment arrangement 36 between its first and second orientations, whilst the attachment arrangement 36 will not be flexible enough to distort out of its locking, second orientation. The block 34 may be manufactured by moulding, building up in layers. It is possible to vary the material properties during manufacture by varying the materials in successive layers so that the attachment arrangement 36 is integral to the seal 34, 48 and it is not necessary to form the seal part and attachment arrangement 36 separately and then bond them together. For example, the layers may comprise PTFE or elastomer, fibre glass, ceramic fibres or solid ceramic and rubber with different levels of vulcanisation. The moulding process can incorporate a metal locking feature 42 if required.

Figure 10:
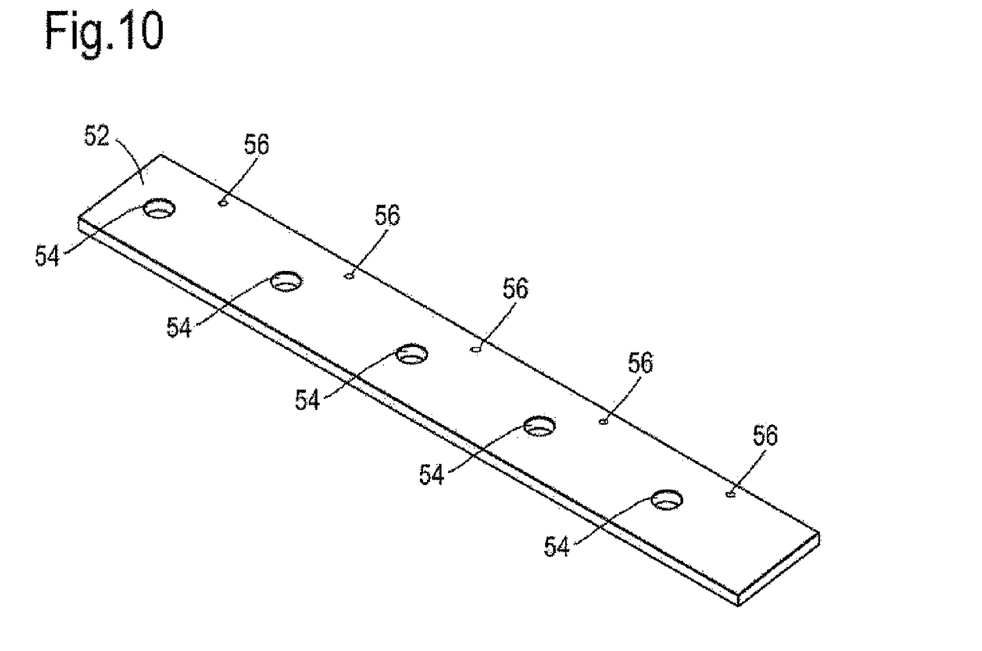
FIG. 10 is an embodiment of a seal locking plate.

FIG. 10 shows a seal locking plate 52 suitable for use with, for example, the linear seal 48 of FIG. 7. The seal locking plate 52 may form the surface of one of the components forming the interface to be sealed or may be a separate component affixed to that component. The seal locking plate 52 comprises a plurality of attachment apertures 54 that are configured and arranged to receive corresponding attachment arrangements 36 when the linear seal 48 is brought into engagement with the seal locking plate 52. The interior of each attachment aperture 54 may be threaded to engage with the partial screw threads 44 of the third embodiment of the attachment arrangement 36. The seal locking plate 52 also comprises a plurality of locking apertures 56 that are configured and arranged to receive respective locking features 42 when each attachment arrangement 36 is rotated to its second orientation after it is received in its respective attachment aperture 54 in its first orientation.

It is to be understood that the seal locking plate 52 may have a different configuration for different embodiments of the attachment arrangements 36 and the locking features 42. For example, to be suitable for use with the linear seal 48 of FIG. 8 the locking apertures 56 comprise deeper recesses in a predetermined position in the attachment apertures 54. Alternatively, the inside of the attachment apertures 54 could be shaped to receive the ends 50 of attachment features 38 of the third embodiment of the locking feature, and no separate locking apertures 56 provided.

Figure 11:
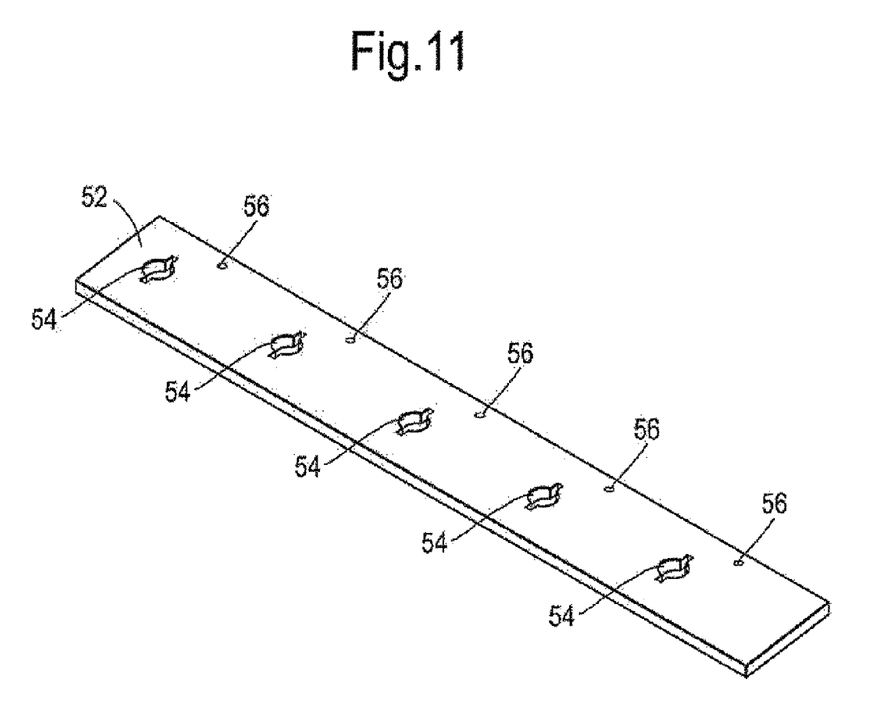
FIG. 11 is another embodiment of a seal locking plate.

FIG. 11 shows an alternative configuration of the seal locking plate 52 in which the attachment apertures 54 are shaped to receive the bayonet-style pins 46 of the attachment features 38 of the fourth embodiment of the attachment arrangement 36. Thus the attachment apertures 54 are circular with a pair of elongate recesses extending away from the main part of the aperture that are sized to receive the pins 46 therethrough when the attachments arrangements 36 are in their first orientation. The pins 46 are rotated until, in the second orientation, they extend over a part of the seal locking plate 52 defining the attachment apertures 54 that does not include the recesses.

Although FIG. 10 and FIG. 11 show a locking aperture 56 for each attachment aperture 54, the invention can also be put into effect with fewer locking apertures 56 and corresponding locking features 42 than attachment apertures 54 and attachment arrangements 36. Alternatively more locking apertures 56 and locking features 42 may be provided than attachment apertures 54 and attachment arrangements 36.

The seal with integral attachment arrangement is advantageous in a variety of applications, particularly those where it is necessary to periodically remove and replace the seals and where it is important that the sealing is as leak-proof as possible. The invention finds particular utility for aerodynamic seals in aerospace applications including the engines, auxiliary power units, aircraft doors and escape hatches. Similarly, it finds utility for tidal turbines and ships; sealing fire zones for nuclear plants and test cells; and for sealing fire sensitive areas of military vehicles such as tanks.

The invention claimed is:

1. A seal comprising:
   at least one integral attachment arrangement, wherein the at least one attachment arrangement comprises:
   at least one attachment feature; and
   at least one locking feature,
   wherein the at least one attachment feature is configured and arranged to interdigitate with features of another component in a first orientation and to lock into the other component in a second rotationally displaced orientation from the first orientation, engaging the locking feature in the second rotationally displaced orientation,
   wherein the at least one attachment feature comprises at least one partial screw thread, a peripheral length of the at least one partial screw thread being less than the total length of the periphery of the at least one attachment feature, and
   wherein the at least one locking feature comprises a distorted shape to the attachment feature at the end distal to the seal, the distorted shape comprising two semi-circular portions that are angled relative to a plane of the seal and to each other.

2. A seal as claimed in claim 1 wherein the at least one locking feature comprises a pin located on the seal.

3. A seal as claimed in claim 1 wherein the at least one locking feature comprises a pin located on the attachment feature.

4. A seal as claimed in claim 1 wherein the seal is a block seal having one attachment feature and one locking feature.

5. A seal as claimed in claim 1 wherein the seal is a linear seal having multiple attachment features.

6. A seal as claimed in claim 5 wherein the seal is flexible such that each attachment feature is rotated between its first and second orientation by rotating that part of the seal on which it is located.

7. A seal as claimed in claim 5 wherein a shape of the seal in cross section is circular and has a flat portion in a flushed position with the circular portion forming a tangent to the circular portion.

8. A seal as claimed in claim 5 wherein seal is circular with opposed flat surfaces in cross section, the attachment features being arranged on the flat surfaces such that rotation in one direction moves opposed pairs of attachment features from their first to their second orientations.

9. A seal as claimed in claim 1 wherein the seal is comprised of silicate impregnated elastomeric.

10. A seal as claimed in claim 1 wherein the locking feature is comprised of silicate impregnated elastomeric.

11. A seal as claimed in claim 1 wherein the locking feature is comprised of metal.

12. A seal as claimed in claim 1 wherein the other component comprises a seal locking plate having an attachment aperture to receive each of the at least one attachment features in the first orientation and to be locked to the at least one attachment feature in the second orientation.

* * * * *